US010693267B2

(12) United States Patent
Yamanishi et al.

(10) Patent No.: US 10,693,267 B2
(45) Date of Patent: Jun. 23, 2020

(54) ROTARY STRUCTURAL BODY (71) Applicant: KABUSHIKI KAISHA TOKAI RIKA DENKI SEISAKUSHO, Aichi (JP)

(72) Inventors: Yuta Yamanishi, Aichi (JP); Kenji Fukuda, Aichi (JP)

(73) Assignee: KABUSHIKI KAISHA TOKAI RIKA DENKI SEISAKUSHO (JP)

( * ) Notice: Subject to any disclaimer, the term of this patent is extended or adjusted under 35 U.S.C. 154(b) by 0 days.

(21) Appl. No.: 16/422,046

(22) Filed: May 24, 2019

(65) Prior Publication Data
US 2019/0372287 A1 Dec. 5, 2019

(30) Foreign Application Priority Data

May 29, 2018 (JP) .................................. 2018-102284

(51) Int. Cl.
*H01R 35/02* (2006.01)
*B60R 16/027* (2006.01)

(52) U.S. Cl.
CPC .......... *H01R 35/025* (2013.01); *B60R 16/027* (2013.01); *H01R 2201/26* (2013.01)

(58) Field of Classification Search
CPC . H01R 35/025; H01R 2201/26; H01R 16/027
USPC .................................................. 439/164, 15
See application file for complete search history.

(56) References Cited

U.S. PATENT DOCUMENTS

| 4,872,842 | A | * | 10/1989 | Ishima | ................. | H01R 35/025 439/15 |
| 5,855,072 | A | | 1/1999 | Nakaho | | |
| 2003/0094955 | A1 | * | 5/2003 | Bonn | .................... | B60R 16/027 324/539 |
| 2006/0272430 | A1 | * | 12/2006 | Araki | .................... | B60R 16/027 73/862.321 |
| 2006/0283271 | A1 | * | 12/2006 | Araki | .................... | B60R 16/027 73/866.5 |
| 2008/0000712 | A1 | * | 1/2008 | Tanaka | ................. | B60R 16/027 180/409 |
| 2009/0317994 | A1 | | 12/2009 | Oishi | | |
| 2013/0093415 | A1 | | 4/2013 | Moldenhauer | | |
| 2013/0095671 | A1 | * | 4/2013 | Arakawa | ............... | B60R 16/027 439/15 |

(Continued)

FOREIGN PATENT DOCUMENTS

| DE | 19712523 A1 | 11/1997 |
| DE | 102010024782 A1 | 12/2011 |
| EP | 2554437 A1 | 2/2013 |

(Continued)

*Primary Examiner* — Gary F Paumen
(74) *Attorney, Agent, or Firm* — Tarolli, Sundheim, Covell & Tummino LLP (57) ABSTRACT

A rotary structural body includes a rotation body that rotates in cooperation with a rotation shaft. The rotation body includes an engaging portion engaged with an engaged portion arranged on one of the rotation shaft and a transmission member that transmits rotation of the rotation shaft to the rotation body. The rotary structural body further includes a detector that detects a rotation angle of the rotation shaft in accordance with rotation of the rotation body and a support arranged on the engaged portion to extend across a circumferential gap between the engaged portion and the engaging portion.

5 Claims, 5 Drawing Sheets

(56) References Cited

U.S. PATENT DOCUMENTS

2014/0266168 A1* 9/2014 Utsunomiya ...... B62D 15/0215
324/207.25
2016/0209244 A1* 7/2016 Siler ........................ G01D 5/26

FOREIGN PATENT DOCUMENTS

| JP | H11135221 A | 5/1999 |
| JP | 2003212129 A | 7/2003 |

* cited by examiner

ROTARY STRUCTURAL BODY

RELATED APPLICATIONS

The present invention is a U.S. patent application, claiming priority to Serial No. JP 2018-102284, filed on 29 May 2018, the entirety of which is incorporated herein by reference.

BACKGROUND

1. Field

The present disclosure relates to a rotary structural body including a rotation mechanism that rotates integrally with a rotation shaft and a detection mechanism that detects rotation of the rotation shaft.

2. Description of Related Art

As a typical rotary structural body, Japanese Laid-Open Patent Publication No. 2003-212129 discloses a rotary connector used in a vehicle steering device. In the rotary connector, a steering roll connector (SRC), or a rotation mechanism, and a steering angle sensor (SAS), or a detection mechanism, are coupled integrally with each other.

The SRC includes a stator and a rotator rotationally coupled to the stator. A flexible flat cable that electrically connects the steering wheel side and the vehicle body side is arranged between a connector of the stator and a connector of the rotator in a manner allowing the winding of the flexible flat cable to be tightened and loosened.

The rotary connector includes a joint member that couples the rotator to the stator so that the rotator is rotational relative to the stator. The SAS incorporates a drive gear having a guide projection. The guide projection is fitted to a guide groove formed in the joint member. The drive gear of the SAS rotates in accordance with rotation of the steering wheel. The drive gear meshes with a driven gear. Rotation of the driven gear is detected by a detector of the SAS to detect rotation of the steering wheel.

There may be a fitting gap between the wall of the guide groove and the guide projection. In such a case, the drive gear of the SAS cannot rotate immediately following rotation of the steering shaft. This causes a free rotation of the steering shaft and lowers the accuracy of detecting the steering angle.

SUMMARY

Thus, it is an objective of the present disclosure to provide a rotary structural body that increases the accuracy of detecting a rotation angle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An embodiment of a rotary structural body includes a rotation body, a detector, and a support. The rotation body rotates in cooperation with a rotation shaft and includes an engaging portion engaged with an engaged portion arranged on one of the rotation shaft and a transmission member that transmits rotation of the rotation shaft to the rotation body. The detector detects a rotation angle of the rotation shaft in accordance with rotation of the rotation body. The support is arranged on the engaged portion and extends across a circumferential gap between the engaged portion and the engaging portion.

With this configuration, the rotation body follows rotation of the rotation shaft. This increases the accuracy of detecting a rotation angle.

In the rotary structural body, the support may have an elastic force that is greater than force applied to the rotation body from one of the rotation shaft and the transmission member.

With this configuration, the support does not bend when the rotation shaft rotates. This ensures that the rotation body follows rotation of the rotation shaft.

In the rotary structural body, the support may include a fixed end located at an upstream side in a coupling direction in which the rotation body is coupled to one of the rotation shaft and the transmission member. The support also may include a contact portion located at a downstream side in the coupling direction in contact with the engaging portion of the rotation body. The support further may include a guide portion extending from the fixed end to the contact portion and separated from the engaging portion by a distance that decreases at positions closer to the contact portion.

With this configuration, the rotation body is guided and coupled. This facilitates the coupling.

In the rotary structural body, one of the engaging portion and the engaged portion may include a groove and the other one of the engaging portion and the engaged portion may include a projection. The support may include a spring piece arranged on at least one of opposing walls of the groove opposed to the projection to extend across a circumferential gap between the at least one of the opposing walls of the groove and the projection.

With this configuration, the spring piece that extends across the circumferential gap between the groove and the projection elastically holds the projection of the rotation body. This allows the rotation body to follow rotation of the rotation shaft and increases the accuracy of detecting a rotation angle.

Other features and embodiments will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described.

Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of a rotary structural body will now be described below.

Figure 1:
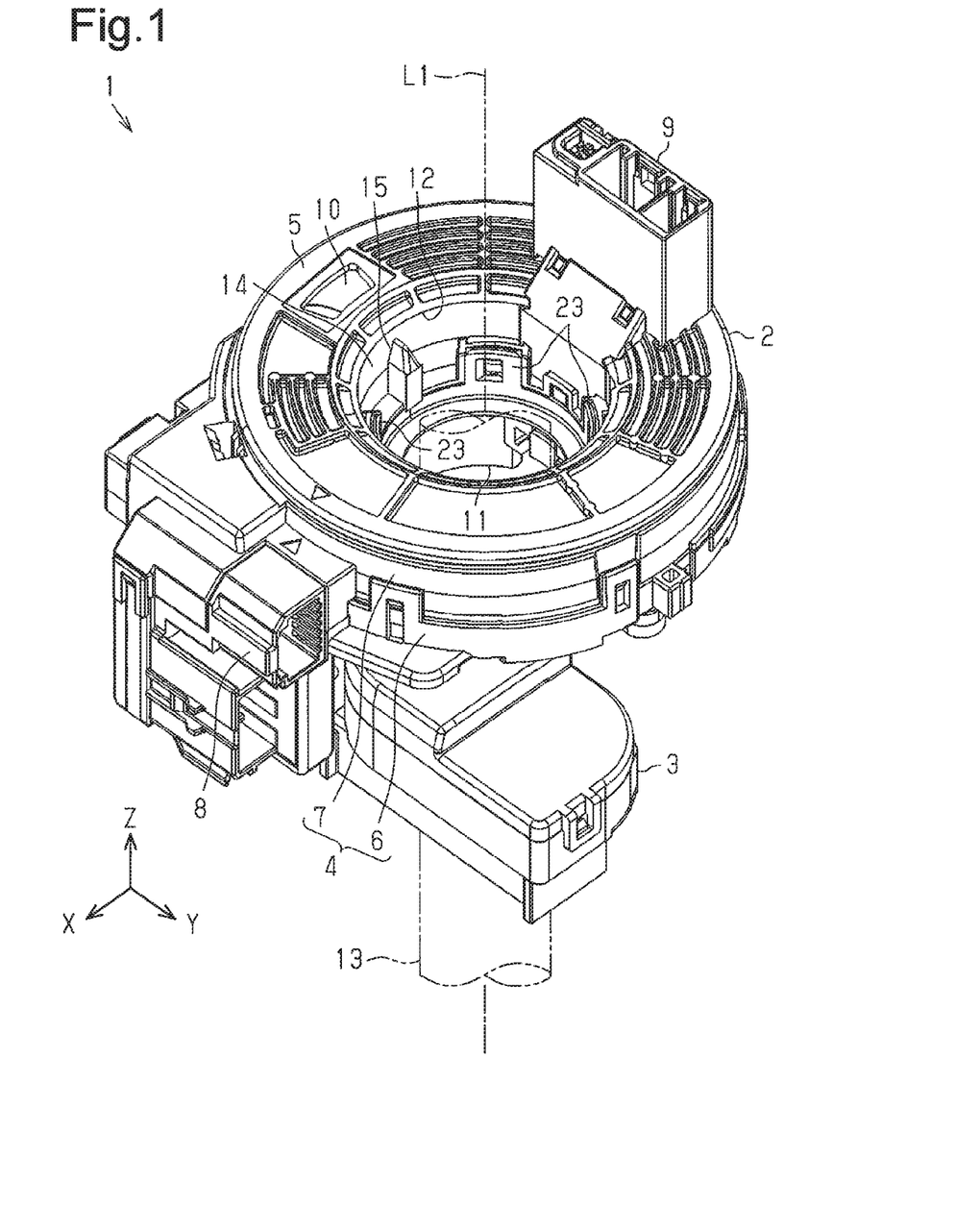
FIG. 1 is a perspective view of an embodiment of a rotary connector.
Figure 2:
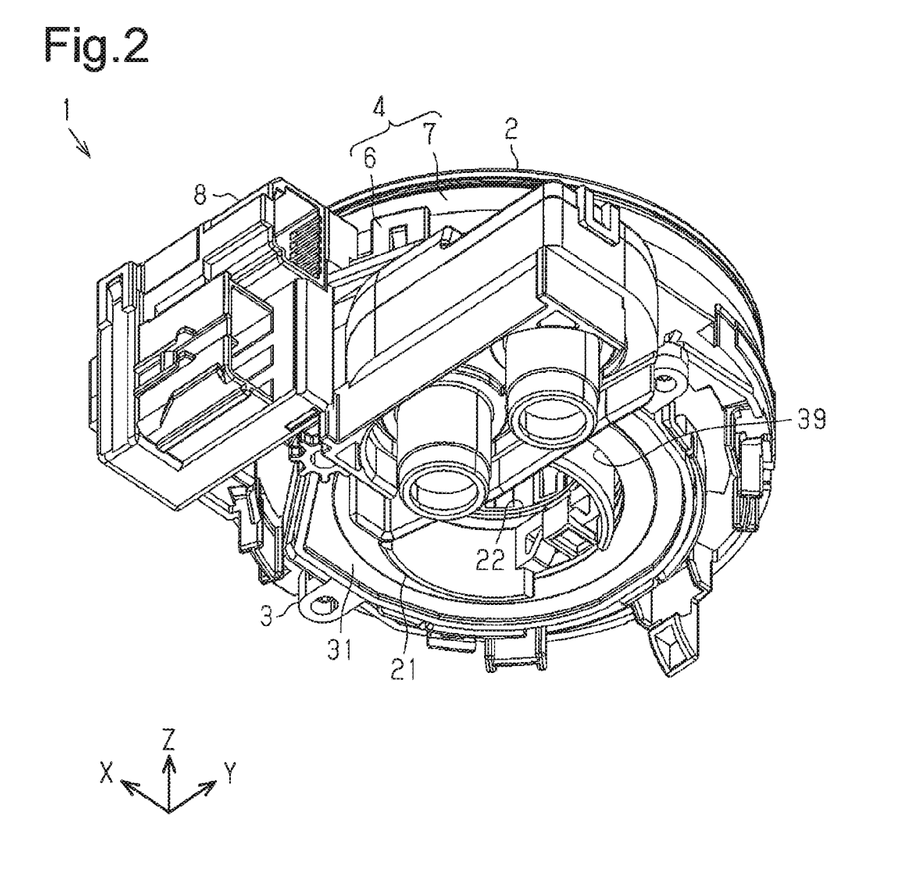
FIG. 2 is a perspective view of the rotary connector taken from a rear side.
Figure 3:
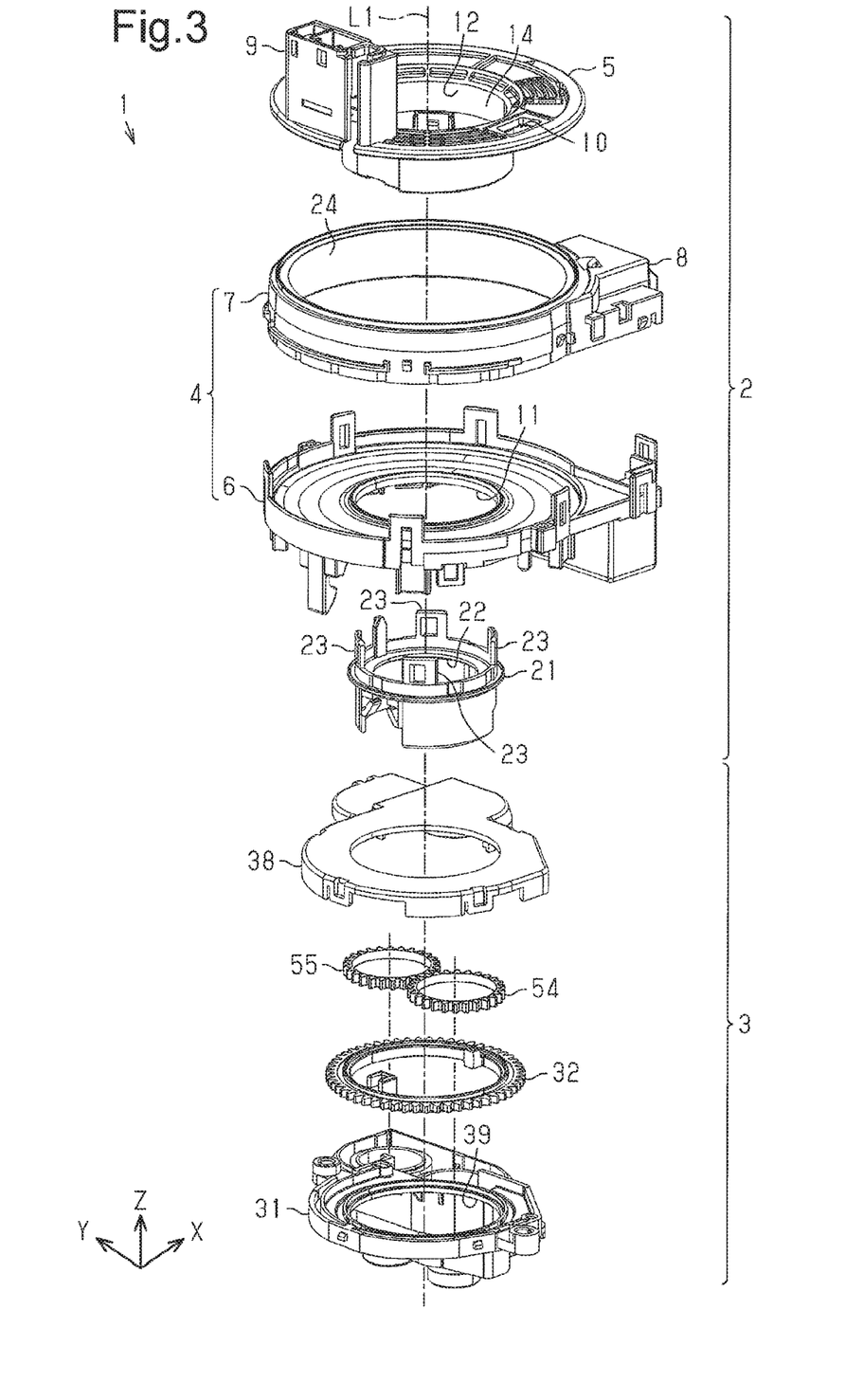
FIG. 3 is an exploded perspective view of the rotary connector.

As illustrated in FIGS. 1 to 3, a rotary connector 1, which is an example of a rotary structural body, includes a steering roll connector 2 (SRC) and a steering angle sensor 3 (SAS). The SAS 3 is located on a rear surface of the SRC 2. The SRC 2 includes a stator 4 and an annular rotator 5 rotationally coupled to the stator 4. A main stator 6 that defines the bottom of the stator 4 is coupled to an annular sub-stator 7 that defines a wall of the stator 4 to form the stator 4. The stator 4 and the rotator 5 are coaxially arranged so that the rotator 5 rotates relative to the stator 4 about an axis L1.

The SRC 2 accommodates a flexible flat cable (not illustrated) in a manner allowing the winding of the flexible flat cable to be tightened and loosened. The flexible flat cable electrically connects the vehicle body side and the side of a vehicle steering wheel (not illustrated) coupled to the rotator 5. The flexible flat cable of the SRC 2 has one end connected to a connector 8 of the stator 4 and the other end connected to a connector 9 of the rotator 5. The rotator 5 has an upper surface including a view window 10 that allows for a visual check of the state of the flexible flat cable located in the SRC 2.

Through holes 11 and 12 coaxially extend through the stator 4 and the rotator 5, respectively. A steering shaft 13, which is the rotation shaft in the present example, is inserted through the through holes 11 and 12. The rotator 5 includes a cylindrical inner tube 14 defining the through hole 12. The wall of the inner tube 14 includes positioning protrusions 15 (only one illustrated in FIG. 1) that engage with the steering wheel (not illustrated). When rotation of the steering wheel is transmitted to the rotator 5, the rotator 5 and the steering wheel synchronously rotate about the axis L1. The rotator 5 is rotational in a clockwise direction and a counterclockwise direction from the neutral position in accordance with operation of the steering wheel.

As illustrated in FIGS. 2 and 3, the SRC 2 includes a sleeve 21 that couples the rotator 5 to the stator 4 so that the rotator 5 is rotational relative to the stator 4. The sleeve 21 includes a central hole 22, through which the steering shaft 13 is inserted. Coupling pieces 23 (four in the present example) extend upright from a rim of the sleeve 21 and are coupled to the rotator 5 with, for example, a snap-fit structure. The sleeve 21 is coupled to the rotator 5 so that the main stator 6 is sandwiched between the sleeve 21 and the inner tube 14 of the rotator 5. The sleeve 21 has an outer diameter shaped in conformance with the diameter of the through hole 11 in the stator 4. Thus, the sleeve 21, which is coupled to the rotator 5, limits radial and axial movements of the rotator 5 relative to the stator 4.

The SRC 2 includes an accommodation chamber 24, which is an annular region surrounded by the stator 4 and the rotator 5. The accommodation chamber 24 accommodates the flexible flat cable (not illustrated) in a manner allowing the winding of the flexible flat cable to be tightened and loosened.

The SAS 3 is integrally coupled to the SRC 2 and detects the rotation angle of the steering shaft 13 (steering wheel). The SAS 3 includes a gear case 31 and an annular drive gear 32 accommodated in the gear case 31.

Figure 4:
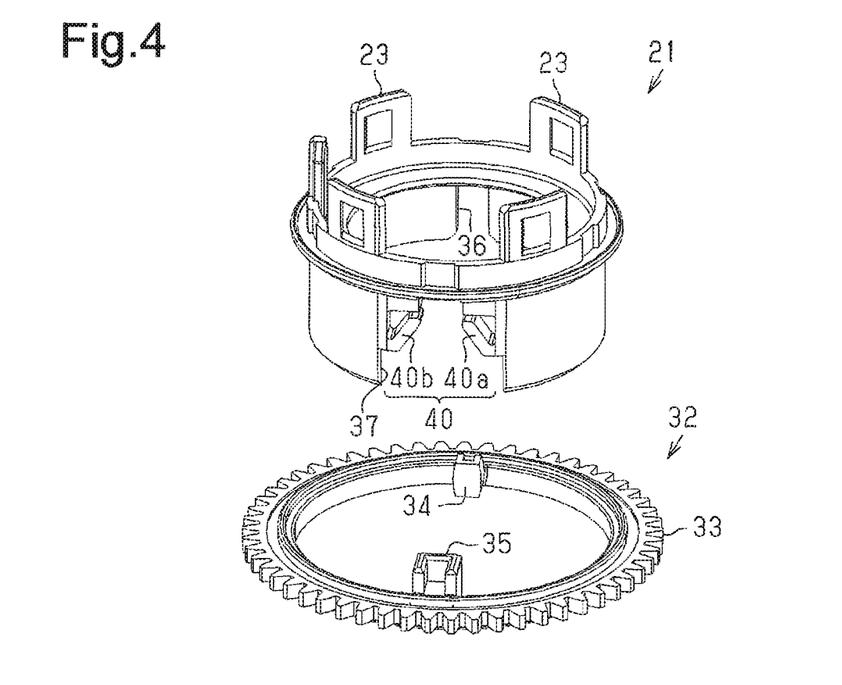
FIG. 4 is a perspective view of a drive gear and a sleeve.

As illustrated in FIG. 4, the drive gear 32 includes teeth 33 arranged on the entire outer circumferential surface, a fitting projection 34 projecting radially inward from the inner circumferential surface, and a guide projection 35 projecting radially inward from the inner circumferential surface at a position opposed to the fitting projection 34. The sleeve 21 includes a fitting groove 36, to which the fitting projection 34 is fitted, and a guide groove 37, to which the guide projection 35 is fitted. When the fitting projection 34 is coupled to the fitting groove 36 and the guide projection 35 is coupled to the guide groove 37, the position in which the sleeve 21 is coupled to the drive gear 32 is determined. In the present embodiment, the guide projection 35 of the drive gear 32 is an example of an engaging portion, and the guide groove 37 of the sleeve 21 is an example of an engaged portion.

Referring to FIG. 3, the gear case 31 includes an upper accommodation portion that accommodates the drive gear 32 and other elements and a hole 39, to which the sleeve 21 is loosely fitted. When a cover 38 is coupled to an upper portion of the gear case 31 and the SAS 3 is coupled to the SRC 2 from a lower side in FIG. 3, the drive gear 32 is positioned and fixed to the sleeve 21 as described above. Thus, the drive gear 32 rotates integrally with the sleeve 21 in accordance with rotation of the steering shaft 13.

Figure 5:
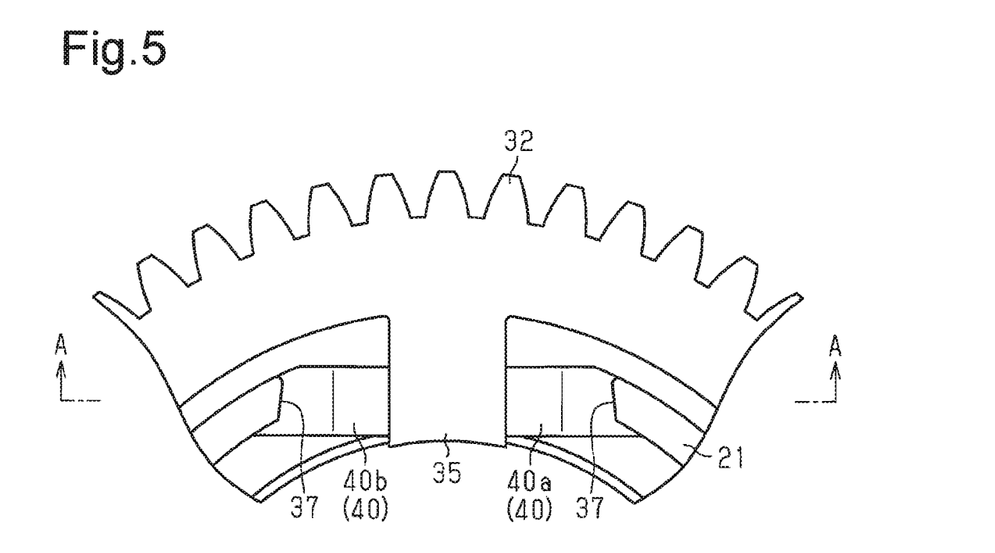
FIG. 5 is a rear view of the drive gear and the sleeve in a coupled state.
Figure 6:
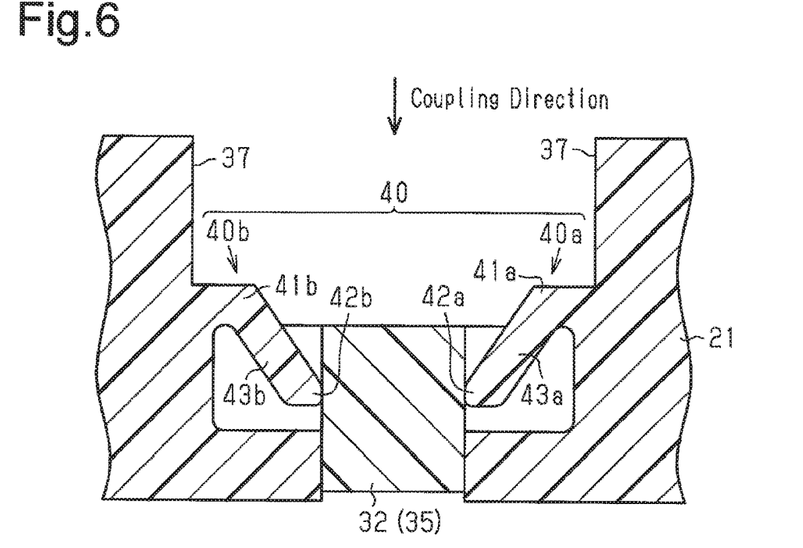
FIG. 6 is a cross-sectional view taken along line A-A in FIG. 5.

As illustrated in FIGS. 5 and 6, a spring portion 40, which is an example of a support, is arranged between the wall of the guide groove 37 of the sleeve 21 and the guide projection 35 of the drive gear 32. The spring portion 40 extends across a circumferential gap between the wall of the guide groove 37 and the guide projection 35. In a non-restrictive example, the spring portion 40 includes two spring pieces 40a and 40b arranged in the guide groove 37. In the present example, the spring pieces 40a and 40b respectively include fixed ends 41a and 41b fixed to opposing walls of the guide groove 37, contact portions 42a and 42b in contact with the guide projection 35, and guide portions 43a and 43b extending from the fixed ends 41a and 41b to the contact portions 42a and 42b. The fixed ends 41a and 41b are located at the upstream side (upper side in FIG. 6) in a coupling direction in which the drive gear 32 is coupled to the sleeve 21. The contact portions 42a and 42b are located at the downstream side in the coupling direction. The guide portions 43a and 43b are separated from the guide projection 35 by a distance that decreases at positions closer to the contact portions 42a and 42b. The spring portion 40 holds the guide projection 35 in cooperation with the spring pieces 40a and 40b and has an elastic force that is greater than force applied to the drive gear 32 from the sleeve 21. Thus, when the steering shaft 13 rotates, the guide projection 35 (drive gear 32) will not have backlash in the rotational direction, which would be formed by bending of the spring pieces 40a and 40b. This allows the sleeve 21 to rotate integrally with the drive gear 32.

The gear case 31 accommodates a first driven gear 54 and a second driven gear 55 together with the drive gear 32. The first driven gear 54 meshes with the drive gear 32. The second driven gear 55 meshes with the first driven gear 54. In the present example, the combination of the drive gear 32, the first driven gear 54, and the second driven gear 55 is an example of a rotation body that rotates in cooperation with the rotation shaft (steering shaft 13 in the present embodiment). The sleeve 21 is an example of a transmission member that transmits rotation of the rotation shaft (steering shaft 13) to the rotation body.

Figure 7:
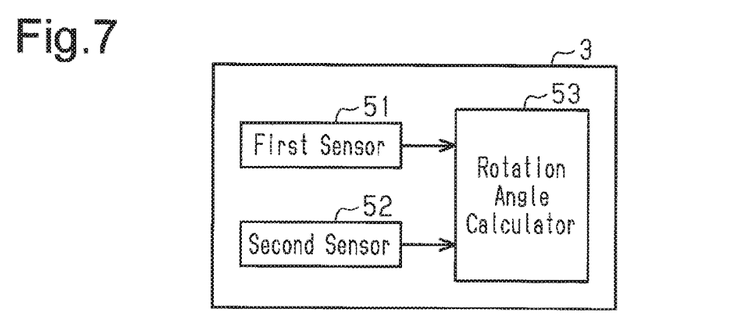
FIG. 7 is a block diagram of a steering angle sensor (SAS).

As illustrated in FIG. 7, the SAS 3 includes a first sensor 51 that detects rotation of the first driven gear 54, a second sensor 52 that detects rotation of the second driven gear 55, and a rotation angle calculator 53 that obtains a rotation angle of the steering shaft 13 from outputs values of the first and second sensors 51 and 52. The first sensor 51, the second sensor 52, and the rotation angle calculator 53 are, for example, mounted on a substrate (not illustrated) accommodated in the gear case 31 or another case. The first sensor 51 and the second sensor 52 are an example of a detector that detects a rotation angle of the steering shaft 13 in accordance with rotation of the rotation body (gears 32, 54, and 55). Each of the first sensor 51 and the second sensor 52 may be any sensor and, for example, an optical sensor or a magnetic sensor. The rotation angle calculator 53 obtains a steering angle (absolute angle) of the steering shaft 13 (the steering wheel) from a neutral rotation position in the clockwise direction and the counterclockwise direction based on the output values of the first and second sensors 51 and 52.

The operation of the rotary connector 1 will now be described.

When the steering wheel (not illustrated) is operated, the rotator 5 and the sleeve 21 rotate integrally with the steering shaft 13, and the driving force is transmitted to the drive gear 32 from the sleeve 21. As illustrated in FIGS. 5 and 6, the two spring pieces 40a and 40b arranged in the guide groove 37 extend across the circumferential gap between the wall of the guide groove 37 in the sleeve 21 and the guide projection 35 of the drive gear 32. Thus, the drive gear 32 of the SAS 3 immediately follows rotation of the steering shaft 13 and rotates. Furthermore, the elastic force of the spring pieces 40a and 40b is greater than the force applied to the drive gear 32 from the sleeve 21. Thus, the guide projection 35 (drive gear 32) will not have backlash, which would be formed by bending of the spring pieces 40a and 40b. Accordingly, with the rotary connector 1, when the steering shaft 13 rotates, free rotation of the rotator 5 is limited.

The present embodiment has the advantages described below.

(1) The sleeve 21, which transmits rotation of the steering shaft 13 to the drive gear 32, includes the spring portion 40 (spring pieces 40a and 40b). This allows the drive gear 32 to follow rotation of the steering shaft 13 and increases the accuracy of detecting the rotation angle.

(2) The spring portion 40 holds the guide projection 35 in cooperation with the spring pieces 40a and 40b and has an elastic force that is greater than the force applied to the drive gear 32 from the sleeve 21. Thus, when the steering shaft 13 rotates, backlash caused by bending of the spring pieces 40a and 40b will not be formed. This allows the drive gear 32 to appropriately follow the rotation of the steering shaft 13.

(3) The spring pieces 40a and 40b respectively include the fixed ends 41a and 41b, which are located at the upstream side in the direction in which the drive gear 32 is coupled to the sleeve 21, the contact portions 42a and 42b, which are located at the downstream side in the coupling direction, and the guide portions 43a and 43b extending from the fixed ends 41a and 41b to the contact portions 42a and 42b. The guide portions 43a and 43b are formed so that the guide portions 43a and 43b are separated from the guide projection 35 of the drive gear 32 by a distance that decreases at positions closer to the contact portions 42a and 42b. With this configuration, when the drive gear 32 is coupled to the sleeve 21, the drive gear 32 is guided by the guide portions 43a and 43b. This facilitates the coupling.

It should be apparent to those skilled in the art that the foregoing embodiments may be implemented in many other specific forms without departing from the scope of this disclosure. Particularly, it should be understood that the foregoing embodiments may be implemented in the following forms.

The foregoing embodiments may be modified as follows. The foregoing embodiments and the following modified examples may be combined within a range having no technical contradiction.

Figure 8:
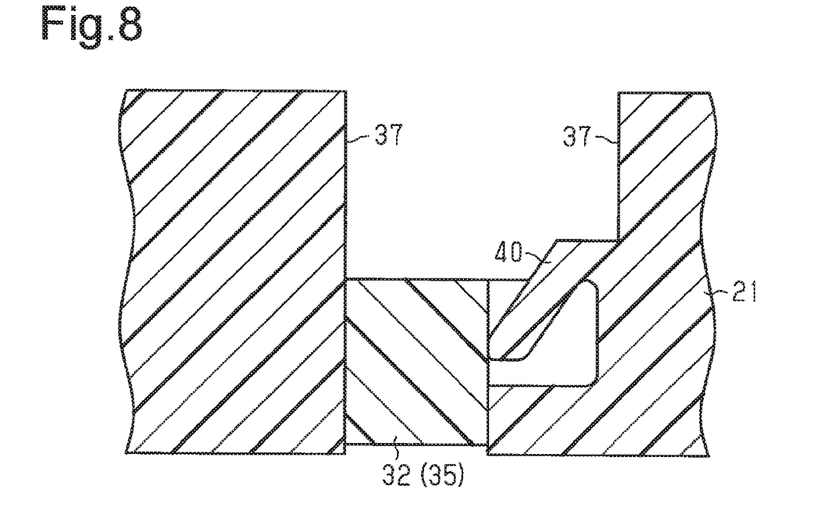
FIG. 8 is a cross-sectional view of a portion of a modified example of a rotary connector.

As illustrated in FIG. 8, the spring portion 40 may be a single spring piece arranged in the guide groove 37 of the sleeve 21. For example, the spring portion 40 (single spring piece) may be arranged on one of the opposing walls of the guide groove 37 to extend across the circumferential gap between the wall and one end surface of the guide projection 35. In this case, the spring portion 40 (single spring piece) has an elastic force that is greater than the force applied to the drive gear 32 from the sleeve 21. The elastic force causes the other one of the opposing walls of the guide groove 37 to come into close contact with the other end surface of the guide projection 35.

The number of guide grooves 37 is not limited to one. The sleeve 21 may include two or more guide grooves 37, and the drive gear 32 may include the same number of guide projections 35 as the guide grooves 37. In this case, the spring portion 40 may be arranged in each guide groove 37. With this configuration, even when one of the spring portions 40 fails, the remaining spring portions 40 operate so that the same advantages as the embodiment is obtained.

The sleeve 21 may include the guide projection 35, and the drive gear 32 may include the guide groove 37. In this case, the spring portion 40 may be arranged on the guide projection 35. In this modified example, the guide groove 37 of the drive gear 32 corresponds to the engaging portion, and the guide projection 35 of the sleeve 21 corresponds to the engaged portion. The terms "engaging portion" and "engaged portion" used in this disclosure refer to two members that engage with each other (in this case, guide projection 35 and guide groove 37). One of the two members may be used as the "engaging portion," and the other member may be used as the "engaged portion."

The "engaging portion" may be arranged on the drive gear 32 (rotation body), and the "engaged portion" may be arranged on the steering shaft 13 (rotation shaft) instead of the sleeve 21. In this modified example, when the engaging portion (for example, one of guide projection 35 and guide groove 37) of the drive gear 32 engages with the engaged portion (for example, the other one of guide projection 35 and guide groove 37) of the steering shaft 13, the drive gear 32 is directly connected to the steering shaft 13 and rotation of the steering shaft 13 is directly transmitted to the drive gear 32. With this configuration, the spring portion 40 may be arranged on the engaged portion of the steering shaft 13. In this case, the rotary structural body according to the present disclosure may be embodied as a rotation detection device corresponding to the SAS 3 of the embodiment.

Instead of a configuration in which the sleeve 21 (or steering shaft 13) includes the spring portion 40, the spring portion 40 (at least one spring piece) may be arranged as a separate member between the sleeve 21 (or steering shaft 13) and the drive gear 32.

As described in the embodiment or modified examples, the spring portion 40, which is one example of "support", may be shaped to facilitate the coupling of the drive gear 32 to the sleeve 21 or the steering shaft 13. However, the spring portion 40 may have a different shape that extends across the circumferential gap between the engaged portion of the sleeve 21 or the steering shaft 13 and the engaging portion of the drive gear 32. The term "support" used in this disclosure refers to any member that extends across a circumferential gap between the engaging portion and the engaged portion. The support may have any shape besides the shape of a spring.

In the embodiment, the SAS 3 calculates the rotation angle of the steering shaft 13 based on rotation of the first driven gear 54 and rotation of the second driven gear 55. This does not limit the process for calculating the rotation angle of the steering shaft 13. For example, the rotation angle of the steering shaft 13 may be directly calculated from rotation of the drive gear 32. In this case, the drive gear 32 may be configured to be a member of a rotary encoder of an optical type, a magnetic type, or other types. The term "rotation body" used in this disclosure refers to any member that rotates in cooperation with the rotation shaft (steering shaft 13 in the embodiment) and is not limited to the combination of the drive gear 32, the first driven gear 54, and the second driven gear 55.

The use of the rotary structural body according to the present disclosure is not limited to a vehicle. The rotary structural body may be used for other devices.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A rotary structural body, comprising:
    a rotation body that rotates in cooperation with a rotation shaft and includes an engaging portion engaged with an engaged portion, the engaged portion being arranged on one of the rotation shaft and a transmission member that transmits rotation of the rotation shaft to the rotation body;
    a detector that detects a rotation angle of the rotation shaft in accordance with rotation of the rotation body; and
    a support arranged on the engaged portion and extending across a circumferential gap between the engaged portion and the engaging portion,
    wherein the support has an elastic force that is greater than force applied to the rotation body from one of the rotation shaft and the transmission member.

2. The rotary structural body according to claim 1, wherein the support includes
    a fixed end located at an upstream side in a coupling direction in which the rotation body is coupled to one of the rotation shaft and the transmission member,
    a contact portion located at a downstream side in the coupling direction in contact with the engaging portion of the rotation body, and
    a guide portion extending from the fixed end to the contact portion and separated from the engaging portion by a distance that decreases at positions closer to the contact portion.

3. The rotary structural body according to claim 1, wherein
    one of the engaging portion and the engaged portion includes a groove,
    the other one of the engaging portion and the engaged portion includes a projection,
    the support includes a spring piece arranged on at least one of opposing walls of the groove opposed to the projection, and
    the spring piece extends across a circumferential gap between the at least one of the opposing walls of the groove and the projection.

4. A rotary structural body comprising:
    a rotation body that rotates in cooperation with a rotation shaft and includes an engaging portion engaged with an engaged portion, the engaged portion being arranged on one of the rotation shaft and a transmission member that transmits rotation of the rotation shaft to the rotation body;
    a detector that detects a rotation angle of the rotation shaft in accordance with rotation of the rotation body; and
    a support arranged on the engaged portion and extending across a circumferential gap between the engaged portion and the engaging portion, wherein the support includes
        a fixed end located at an upstream side in a coupling direction in which the rotation body is coupled to one of the rotation shaft and the transmission member,
        a contact portion located at a downstream side in the coupling direction in contact with the engaging portion of the rotation body, and
        a guide portion extending from the fixed end to the contact portion and separated from the engaging portion by a distance that decreases at positions closer to the contact portion.

5. A rotary structural body comprising:
    a rotation body that rotates in cooperation with a rotation shaft and includes an engaging portion engaged with an engaged portion, the engaged portion being arranged on one of the rotation shaft and a transmission member that transmits rotation of the rotation shaft to the rotation body;
    a detector that detects a rotation angle of the rotation shaft in accordance with rotation of the rotation body; and
    a support arranged on the engaged portion and extending across a circumferential gap between the engaged portion and the engaging portion, wherein
    one of the engaging portion and the engaged portion includes a groove,
    the other one of the engaging portion and the engaged portion includes a projection,
    the support includes a spring piece arranged on at least one of opposing walls of the groove opposed to the projection, and
    the spring piece extends across a circumferential gap between the at least one of the opposing walls of the groove and the projection.

* * * * *